United States Patent
Kim et al.

(10) Patent No.: US 9,678,994 B2
(45) Date of Patent: Jun. 13, 2017

(54) METHOD OF BACKING UP PROFILE AND APPARATUS THEREFOR

(71) Applicant: KT CORPORATION, Gyeonggi-do (KR)

(72) Inventors: Kwan Lae Kim, Seoul (KR); Chul Hyun Park, Seoul (KR); Jin Hyoung Lee, Seoul (KR); Hyung Jin Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 583 days.

(21) Appl. No.: 13/918,471

(22) Filed: Jun. 14, 2013

(65) Prior Publication Data
US 2013/0339306 A1    Dec. 19, 2013

(30) Foreign Application Priority Data

Jun. 15, 2012   (KR) .................. 10-2012-0064316
Jun. 5, 2013    (KR) .................. 10-2013-0064900

(51) Int. Cl.
*G06F 17/30* (2006.01)
*H04W 8/20* (2009.01)

(52) U.S. Cl.
CPC ...... *G06F 17/30283* (2013.01); *H04W 8/205* (2013.01)

(58) Field of Classification Search
None
See application file for complete search history.

(56) References Cited

U.S. PATENT DOCUMENTS

| | | | |
|---|---|---|---|
| 7,809,688 B2* | 10/2010 | Cisler | G06F 3/04847 707/654 |
| 2012/0190354 A1* | 7/2012 | Merrien | H04W 4/001 455/422.1 |
| 2013/0275695 A1* | 10/2013 | Ponsford et al. | 711/162 |

FOREIGN PATENT DOCUMENTS

| | | |
|---|---|---|
| KR | 10-2009-0046607 A | 5/2009 |
| KR | 10-2010-0011456 A | 2/2010 |

OTHER PUBLICATIONS

"Embedded SIM Task Force Requirements and Use Cases 1.0" GSM Association, Feb. 21, 2011, 38 pages, vol. 1.0.

* cited by examiner

*Primary Examiner* — Belix M Ortiz Ditren
(74) *Attorney, Agent, or Firm* — Sughrue Mion, PLLC

(57) ABSTRACT

A method and apparatus for backing up a profile of in a repository are disclosed. The method of backing up a profile is a method of backing up a profile in a subscriber management server, and includes receiving a backup request for a profile stored in an authentication module from the authentication module, providing information for at least one repository to the authentication module, the information being generated by confirming a state of the at least one repository to back up the profile according to the backup request, and storing the profile in a repository selected by the authentication module based on the information for at least one repository. Therefore, the user can directly select a reliable repository and back up the profile of the authentication module.

12 Claims, 3 Drawing Sheets

METHOD OF BACKING UP PROFILE AND APPARATUS THEREFOR

CLAIM FOR PRIORITY

This application claims priority to Korean Patent Application Nos. 10-2012-0064316 filed on Jun. 15, 2012, 10-2013-0064900 filed on Jun. 5, 2013 in the Korean Intellectual Property Office (KIPO), the entire contents of which are hereby incorporated by reference.

BACKGROUND

1. Technical Field

Example embodiments of the present invention relate to technology for managing a profile of an eUICC, and more specifically, to a method and apparatus for backing up a profile of an eUICC in a repository.

2. Related Art

A UICC (Universal Integrated Circuit Card) is a smart card that can be used as a module for user authentication that is inserted into a terminal. The UICC may store personal information of a user and operator information for a mobile network operator to which the user has subscribed. For example, the UICC may include IMSI (International Mobile Subscriber Identity) for identifying a user.

Further, a UICC may be called a SIM (Subscriber Identity Module) card when using a GSM (Global System for Mobile communications) scheme. The UICC may be called a USIM (Universal Subscriber Identity Module) card when using a WCDMA (Wideband Code Division Multiple Access) scheme.

When a user mounts a UICC on a terminal of the user, user authentication is automatically performed using information stored in the UICC, enabling the user to conveniently use the terminal. Further, when the user replaces an existing terminal, the user can easily replace the terminal by mounting a UICC detached from the existing terminal on a new terminal.

Meanwhile, it is difficult to miniaturize a terminal requiring miniaturization, such as a terminal for machine to machine (M2M) communication, when the terminal is manufactured with a structure in which a UICC is capable of being attached or detached. Accordingly, an embedded UICC (eUICC) structure in which an UICC is incapable of being attached or detached has been proposed.

An existing UICC is capable of being attached to or detached from a terminal, enabling a user to open the terminal regardless of a type of the terminal and a mobile network operator. However, IMSI in the eUICC is allowed to be allocated only when a UICC embedded upon manufacturing a terminal should be used for only a specific mobile network operator. Accordingly, information (e.g., IMSI) of a user of a UICC must be installed in the eUICC using a method such as downloading, for tasks such as ordering, opening and terminating for the terminal.

In other words, an existing UICC is capable of being attached to or detached from a terminal. Accordingly, when a terminal is replaced, personal information of a user and information of an operator to which the user has subscribed can be moved to a new device by detaching and inserting the UICC. However, in the case of an eUICC, it is difficult to move personal information of an existing user and information of an operator to another device, or bring the personal information of the user and the information of the operator from another device, due to physical properties of the eUICC.

SUMMARY

Accordingly, example embodiments of the present invention are provided to substantially obviate one or more problems due to limitations and disadvantages of the related art.

Example embodiments of the present invention provide a method of backing up a profile in an environment in which an eUICC is used.

Other example embodiments of the present invention provide an apparatus for backing up a profile in an environment in which an eUICC is used.

In some example embodiments, a method of backing up a profile in a subscriber management server includes: receiving a backup request for a profile stored in an eUICC device from the eUICC device; providing information for at least one repository to the eUICC device, the information being generated by confirming a state of the at least one repository to back up the profile according to the received backup request; and storing the profile in a repository selected by the eUICC device based on the information for at least one repository.

Here, the receiving of the backup request may include receiving credential information of a user of the eUICC device together with the backup request.

Here, the providing of the information for the at least one repository to the eUICC device may include generating the information for at least one repository including list information and availability information for the at least one repository, and delivering the information to the eUICC device.

Here, the storing of the profile in the repository selected by the eUICC device may include receiving a profile encrypted by the eUICC device and storing the encrypted profile in the repository selected by the eUICC device.

Here, the storing of the profile in the repository selected by the eUICC device may include storing the profile to two or more repositories selected by the eUICC device.

In other example embodiments, a method of backing up a profile in an eUICC device includes: transmitting a backup request for backup of a profile stored in the eUICC device to a subscriber management server; receiving information for at least one repository from the subscriber management server that receives the backup request, the information being generated by the subscriber management server through confirmation of a state of the at least one repository; and selecting a repository to store the profile through a user interface of the eUICC device based on the information for at least one repository.

Here, the transmitting of the backup request to the subscriber management server may include transmitting credential information of a user of the eUICC device together with the backup request to the subscriber management server.

Here, the receiving of the information for at least one repository from the subscriber management server may include receiving the information for at least one repository including list information and availability information for the at least one repository from the subscriber management server.

Here, the method may further include transmitting the profile to the subscriber management server to be stored in the selected repository.

Here, the transmitting of the profile to the subscriber management server may include encrypting the profile and transmitting the encrypted profile to the subscriber management server.

In still other example embodiments, an apparatus for backing up a profile includes: a backup request reception unit configured to receive a backup request for a profile stored in an eUICC device from the eUICC device; a repository information providing unit configured to provide information for at least one repository to the eUICC device, the information being generated by recognizing a state of the at least one repository to back up the profile according to the received backup request; and a profile delivery unit configured to deliver the profile to a repository selected by the eUICC device based on the information for at least one repository.

Effects of the Invention

With the method and apparatus for backing up a profile according to example embodiments of the present invention as described above, a user can directly select a reliable repository and back up the profile of the eUICC device.

Further, the operator can easily back up the profile of the eUICC using the subscriber management server instead of a user of the eUICC.

Furthermore, a plurality of repositories can be selected to back up the profile, thereby coping with emergency situations.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
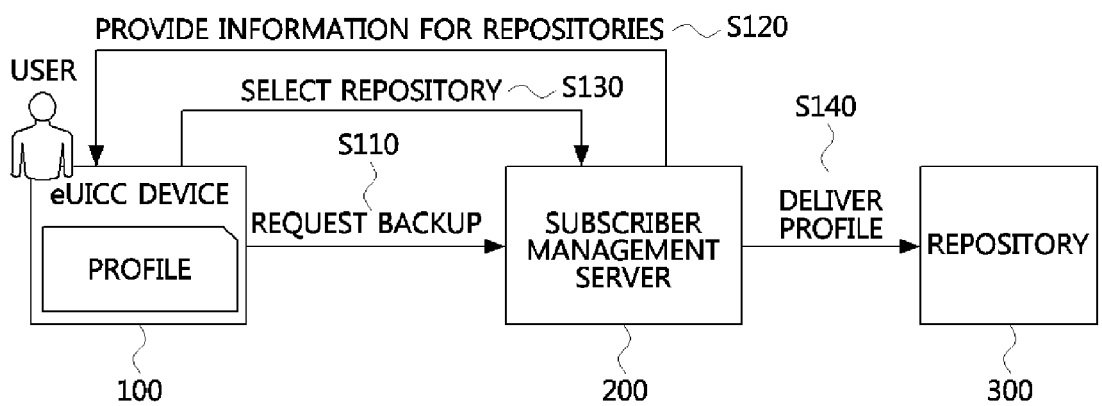
FIG. 1 is a conceptual diagram illustrating a method of backing up a profile according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising" "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred example embodiments of the present invention will be described with reference to the accompanying drawings.

FIG. 1 is a conceptual diagram illustrating a method of backing up a profile according to an example embodiment of the present invention.

Referring to FIG. 1, the method of backing up a profile according to an example embodiment of the present invention may be performed by an eUICC device 100, a subscriber management server 200, and a repository 300.

The eUICC device 100 may mean an apparatus on which an embedded UICC incapable of being attached or detached has been mounted. For example, the eUICC device 100 may mean a terminal for machine to machine (M2M) communication. However, in an example embodiment of the present invention, a type of the eUICC device 100 is not particularly limited.

The subscriber management server 200 may mean a server managed by an operator and providing communication service to subscribers. Here, the operator may mean a mobile network operator and may be called an MNO.

The repository 300 may mean a data storage device in which a profile can be backed up, and may be configured as a part of the subscriber management server 200 and may be configured as an external device that is in conjunction with the subscriber management server 200. Further, the repository 300 may be a data storage device or a server managed by the operator or by a third party. Here, the third party may mean a management entity other than a user of the eUICC device 100 and the operator.

The user of the eUICC device 100 (hereinafter referred to as a "user") may request the subscriber management server 200 to back up the profile stored in the eUICC using the eUICC device 100 (S110). For example, the user may request the subscriber management server 200 to back up the profile using a user interface provided by the eUICC device 100.

The profile may include personal information of the user and information of the operator to which the user has subscribed. For example, the profile may mean a SIM (Subscriber Identification Module) profile.

The subscriber management server 200 that receives the backup request may confirm states of a plurality of repositories 300, generate information for the repositories and transmit the information to the eUICC device 100 (S120). Here, the information for the repositories may include list information and availability information of the plurality of repositories.

The user may confirm the list information and the availability information for the repositories through the eUICC device 100, and select the repository 300 to store the profile (S130). For example, the eUICC device 100 may provide a user interface that enables the user to select the repository 300.

Further, the user may transmit the profile to be backed up to the subscriber management server 200 through the eUICC device 100, and the subscriber management server 200 may deliver the received profile to the selected repository 300 to be stored (S140).

Figure 2:
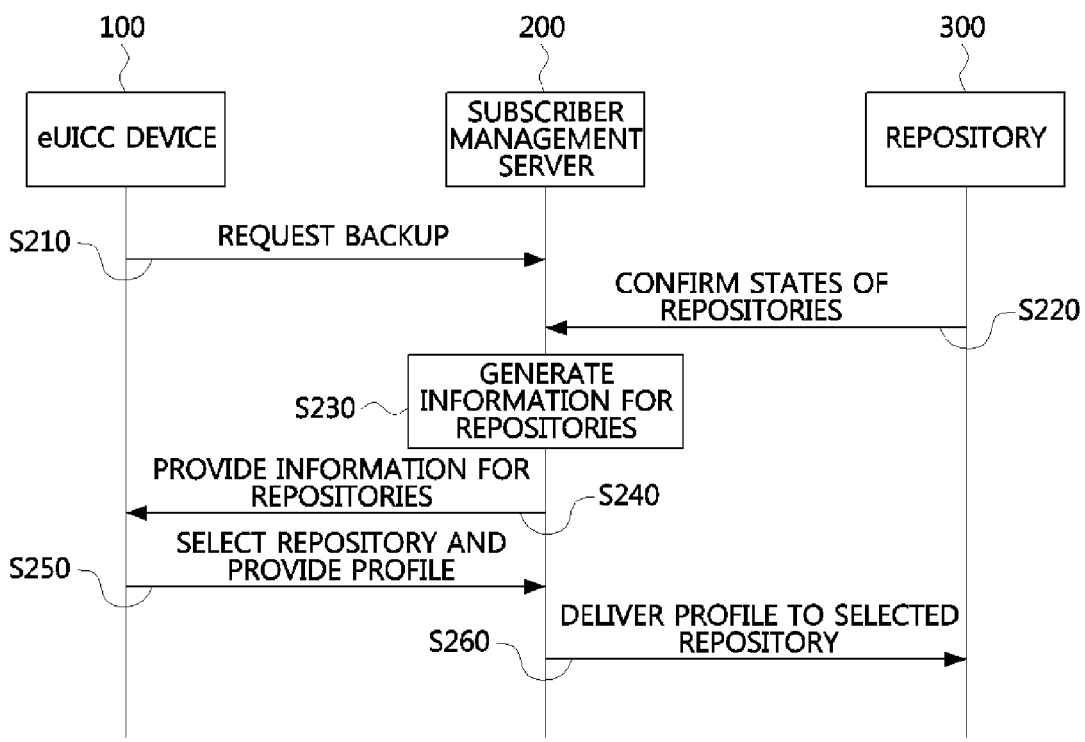
FIG. 2 is a flowchart illustrating a method of backing up a profile according to an example embodiment of the present invention.

FIG. 2 is a flowchart illustrating a method of backing up a profile according to an example embodiment of the present invention.

Referring to FIG. 2, the method of backing up a profile, which is performed by the eUICC device 100, the subscriber management server 200 and the repository 300, will be described in greater detail. The eUICC device 100 may back up the profile stored in the eUICC device 100 through the subscriber management server 200.

The eUICC device 100 may transmit a backup request for backup of the profile to the subscriber management server 200 (S210). In other words, as the backup request is transmitted to the subscriber management server 200, the method of backing up a profile according to an example embodiment of the present invention starts.

Further, the eUICC device 100 may transmit credential information of the user together with the backup request to the subscriber management server 200. Here, the credential information of the user is information that can identify the user and may mean information specific to the user, such as an ID and a password. Therefore, the subscriber management server 200 may identify the eUICC device 100 using the credential information of the user, and may be in conjunction with the eUICC device 100 and the repository 300 based on the credential information of the user.

The subscriber management server 200 may confirm states of the plurality of repositories 300 (S220). In other words, the subscriber management server 200 may connect to the plurality of repositories 300 to confirm or check the states of the plurality of repositories 300. For example, the subscriber management server 200 may confirm the states such as available capacity of the plurality of repositories 300.

After confirming the states of the plurality of repositories 300, the subscriber management server 200 may generate information for the repositories including the list information and the availability information of the repositories (S230).

The subscriber management server 200 may provide the generated information of the repositories to the eUICC device 100 (S240). The eUICC device 100 having received the information for the repositories may provide the information for the repositories to the user through the user interface (S240).

The user may select the repository 300 to store the profile based on the information for the repositories provided through the user interface of the eUICC device 100, and may provide the profile to be backed up to the subscriber management server 200 (S250). Further, the eUICC device 100 may encrypt the profile to be backed up and provide the encrypted profile to the subscriber management server 200, enabling the profile to be backed up more safely in the repository 300.

Furthermore, the user may select the plurality of repositories 300 to store the profile through the user interface of the eUICC device 100. In other words, the profile can be more safely managed by being backed up in the plurality of repositories 300.

The subscriber management server 200 may deliver the profile received from the eUICC device 100 to the repository 300 selected by the eUICC device 100 (S260). Further, the subscriber management server 200 may deliver the profile to the plurality of repositories 300 selected by the eUICC device 100.

Therefore, the repository 300 having received the profile from the subscriber management server 200 may store the profile.

Figure 3:
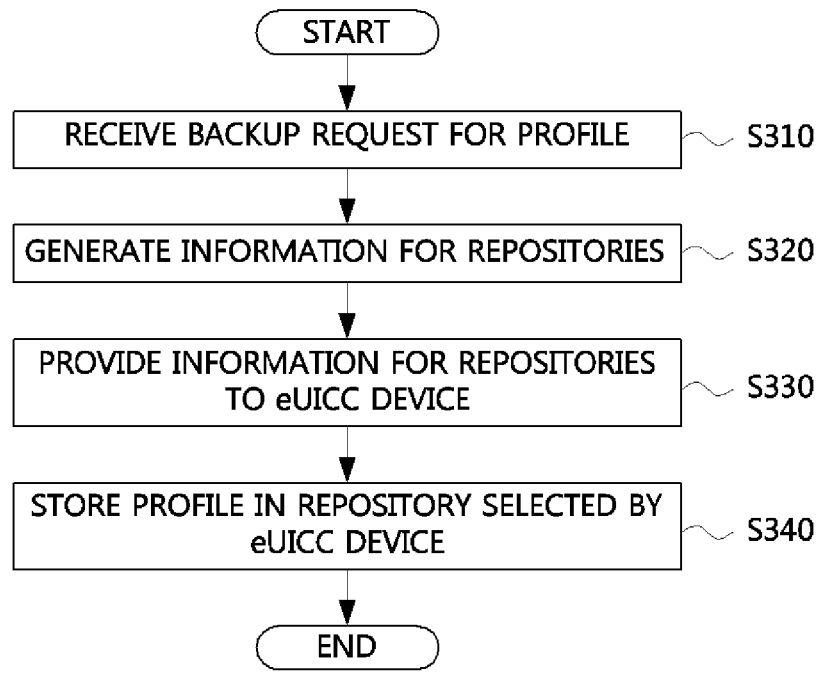
FIG. 3 is a flowchart illustrating a method of backing up a profile in a subscriber management server according to an example embodiment of the present invention.

FIG. 3 is a flowchart illustrating a method of backing up a profile in the subscriber management server according to an example embodiment of the present invention.

A method of backing up a profile in the subscriber management server 200 will be described with reference to FIG. 3. The method of backing up a profile in the subscriber management server 200 may be divided into a step of receiving a backup request for a profile, a step of providing information for a repository to the eUICC device 100, and a step of storing a profile in the repository 300 selected by the eUICC device 100.

The backup request for the profile stored in the eUICC device 100 may be received from the eUICC device 100 (S310). In other words, a user may request a subscriber server to back up the profile using the user interface of the eUICC device 100.

Further, the subscriber management server 200 may receive credential information of the user together with the backup request. For example, the subscriber management server 200 may identify the eUICC device 100 using the credential information of the user and back up the profile.

The subscriber management server 200 that receives the backup request may confirm states of a plurality of repositories 300 to back up the profile and generate information for the repositories (S320). For example, the subscriber management server 200 may be in conjunction with the plurality of repositories 300 and confirm or recognize the states of the plurality of repositories 300. Therefore, the subscriber management server 200 may confirm the states of the plurality of repositories 300 and generate the information of the repositories. Here, the information for the repositories may include list information and availability information for a plurality of repositories.

The subscriber management server 200 may provide the generated information for the repositories to the eUICC device 100 (S330). In other words, the subscriber management server 200 provides the generated information for the repositories to the eUICC device 100 so that the user of the eUICC device 100 can select the repository 300 to store the profile based on the information of the repositories. Here, the user may select two or more repositories 300 to back up the profile.

The subscriber management server 200 may deliver the profile received from the eUICC device 100 to the repository 300 selected by the eUICC device 100 such that the profile can be stored in the repository 300 selected by the eUICC device 100 (S340).

Further, it is understood that the subscriber management server 200 may deliver the profile received from the eUICC device 100 to a plurality of repositories 300 selected by the eUICC device 100 such that the profile can be stored in the plurality of repositories 300 selected by the eUICC device 100. Accordingly, the plurality of repositories 300 may receive the profile delivered from the subscriber management server 200 and store the profile.

Figure 4:
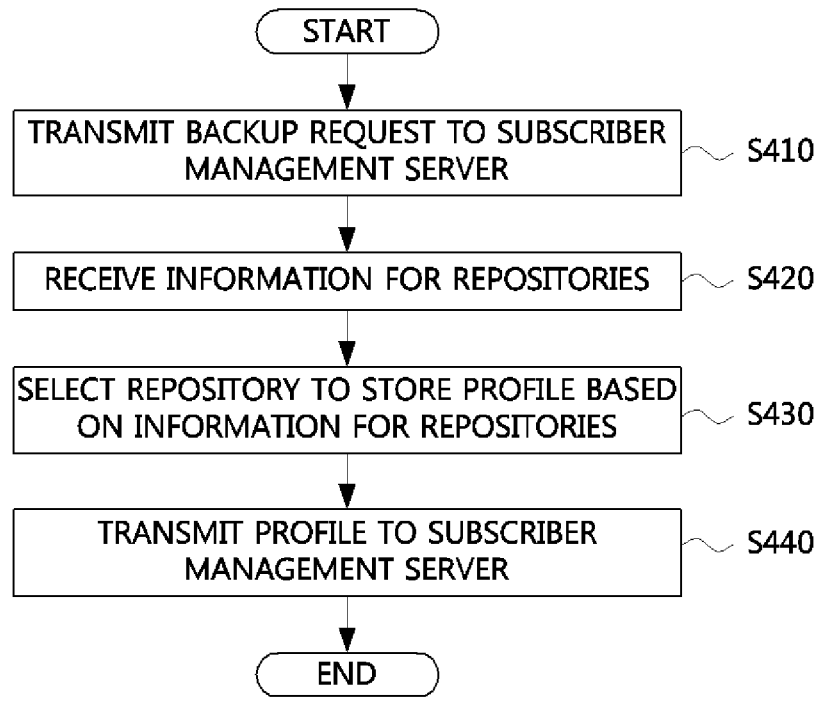
FIG. 4 is a flowchart illustrating a method of backing up a profile in an eUICC device according to an example embodiment of the present invention.
Figure 5:
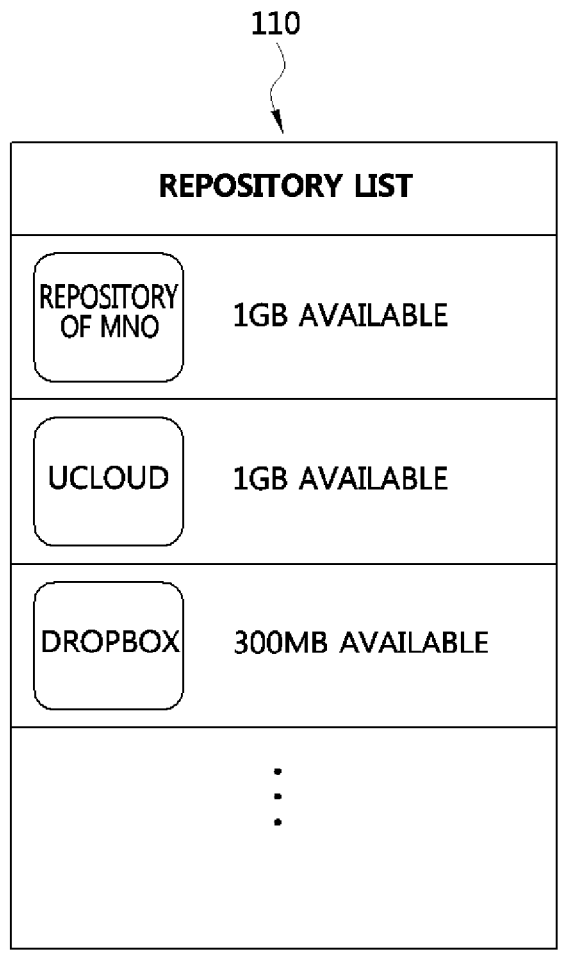
FIG. 5 is an illustrative diagram illustrating a user interface of an eUICC for repository selection according to an example embodiment of the present invention.

FIG. 4 is a flowchart illustrating a method of backing up a profile in the eUICC device according to an example embodiment of the present invention, and FIG. 5 is an illustrative diagram illustrating the user interface of the eUICC for repository selection according to an example embodiment of the present invention.

The method of backing up a profile in the eUICC device 100 will be described with reference to FIG. 4.

The eUICC device 100 may transmit a backup request for backup of a profile stored in the eUICC device 100 to the subscriber management server 200 (S410). In this case, the eUICC device 100 transmits credential information of the user together with the backup request such that the subscriber management server 200 can identify the eUICC device 100 using the credential information of the user and back up the profile.

The eUICC device 100 may receive information for a plurality of repositories from the subscriber management server 200 that receives the backup request, the information being generated by the subscriber management server 200 by confirming states of the plurality of repositories 300 (S420). Here, the information for the repositories may include list information and availability information for the repositories.

Further, referring to FIG. 5, the eUICC device 100 may provide the information for the repositories to the user through the user interface. In other words, FIG. 5 illustrates a screen 110 on which the information for the repositories provided through the user interface of the eUICC device 100 is displayed.

The eUICC device 100 may display available capacity of each repository 300 together with a list of repositories 300. For example, the repository 300 in conjunction with the subscriber management server 200 may include a MNO repository, ucloud, and Dropbox, which are repositories managed by the operator.

The user may select the repository 300 to store the profile based on the information for the plurality of repositories displayed on the user interface of the eUICC device 100 (S430). Further, it is understood that that the user may select a plurality of repositories 300 to store the profile through the user interface of the eUICC device 100.

The eUICC device 100 transmits the profile to the subscriber management server 200 (S440) so that the profile can be backed up in the repository 300 selected by the eUICC device 100. Further, the eUICC device 100 may encrypt the profile and transmit the encrypted profile to the subscriber management server 200 such that the profile can be transmitted more safely.

Figure 6:
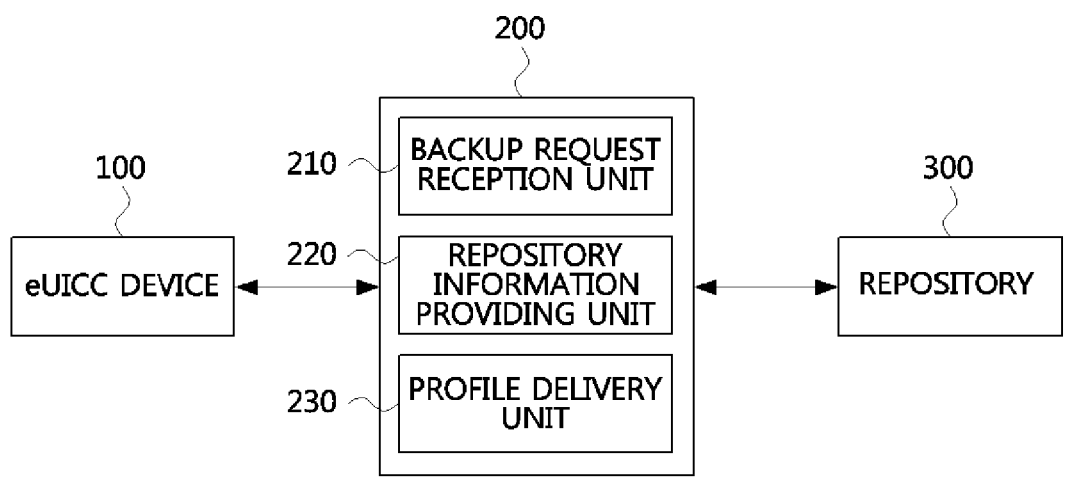
FIG. 6 is a block diagram illustrating an apparatus for backing up a profile according to an example embodiment of the present invention.

FIG. 6 is a block diagram illustrating an apparatus for backing up the profile according to an example embodiment of the present invention.

An apparatus for performing the method of backing up a profile according to the example embodiment of the present invention will be described with reference to FIG. 6. An eUICC device 100 may back up a profile in a repository 300 through a subscriber management server 200. Therefore, the profile backup apparatus may be the subscriber management server 200.

The subscriber management server 200 includes a backup request reception unit 210, a repository information providing unit 220, and a profile delivery unit 230.

The backup request reception unit 210 may receive a backup request of a profile stored in the eUICC device 100 from the eUICC device 100. Further, the backup request reception unit 210 may receive credential information of a user of the eUICC device 100 together with the backup request. In other words, the eUICC device 100 may be identified based on the credential information of the user and the profile may be backed up.

The repository information providing unit 220 may provide the eUICC device 100 with information for a plurality of repositories 300 generated by recognizing states of the plurality of repositories 300 to back up the profile according to the received backup request. Here, the information for the repositories may include list information and availability information for the repositories.

The profile delivery unit 230 may deliver the profile to the repository 300 that is selected by the eUICC device 100 based on the information for the plurality of repositories. Further, the profile delivery unit 230 may receive the profile encrypted by the eUICC device 100 and deliver the encrypted profile to the repository 300 selected by the eUICC device 100.

Furthermore, it is understood that the profile delivery unit 230 may deliver the profile to two or more repositories 300 selected by the eUICC device 100.

While each component of the subscriber management server 200 according to the example embodiment of the present invention has been described as a separate component for convenience of description, at least two of the components may be combined as a one component, or one component may be divided into a plurality of components, to perform functions. Embodiments in which the components are combined or divided are included within the scope and spirit of the present invention.

With the method and apparatus for backing up a profile according to the example embodiment of the present invention described above, a user can directly select a reliable repository and back up the profile of the eUICC device.

Further, the operator can easily back up the profile of the eUICC using the subscriber management server instead of a user of the eUICC.

Furthermore, a plurality of repositories can be selected to back up the profile, thereby coping with emergency situations.

While example embodiments of the present invention and their advantages have been described in detail, it should be understood that various changes, substitutions and alterations may be made herein without departing from the scope of the invention.

What is claimed is:

1. A method of backing up a profile in a subscriber management server, the method comprising:
 receiving, at the subscriber management server, a backup request for a profile stored in an eUICC device from the eUICC device;
 receiving, at the subscriber management server, a confirmation of a state of at least one repository from the at least one repository;
 providing information for at least one repository from the subscriber management server to the eUICC device, the information being generated after the at least one repository confirms to the subscriber management server the state of the at least one repository to back up the profile according to the received backup request; and
 storing the profile in a repository selected by the eUICC device based on the information for at least one repository,
 wherein the providing of the information for the at least one repository to the eUICC device includes generating the information for at least one repository including list information and availability information for the at least one repository, and delivering the information to the eUICC device.

2. The method according to claim 1, wherein the receiving of the backup request includes receiving credential information of a user of the eUICC device together with the backup request.

3. The method according to claim 1, wherein the storing of the profile in the repository selected by the eUICC device includes receiving a profile encrypted by the eUICC device and storing the encrypted profile in the repository selected by the eUICC device.

4. The method according to claim 1, wherein the storing of the profile in the repository selected by the eUICC device includes storing the profile to two or more repositories selected by the eUICC device.

5. A method of backing up a profile in an eUICC device, the method comprising:
 transmitting a backup request for backup of a profile stored in the eUICC device to a subscriber management server;
 receiving information for at least one repository from the subscriber management server receiving the backup request, the information being generated by the subscriber management server after receiving, at the subscriber management server, confirmation of a state of the at least one repository from the at least one repository; and
 selecting a repository to store the profile through a user interface of the eUICC device based on the information for at least one repository,
 wherein the receiving of the information for at east one repository from the subscriber management server includes receiving the information for at least one repository including list information and availability information for the at least one repository from the subscriber management server.

6. The method according to claim 5, wherein the transmitting of the backup request to the subscriber management server includes transmitting credential information of a user of the eUICC device together with the backup request to the subscriber management server.

7. The method according to claim 5, further comprising transmitting the profile to the subscriber management server to be stored in the selected repository.

8. The method according to claim 7, wherein the transmitting of the profile to the subscriber management server includes encrypting the profile and transmitting the encrypted profile to the subscriber management server.

9. An apparatus for backing up a profile, the apparatus comprising:
 a backup request reception unit configured to receive a backup request for a profile stored in an eUICC device from the eUICC device;
 a repository information providing unit configured to provide information for at least one repository to the eUICC device, the information being generated after a confirmation of a state of the at least one repository to back up the profile is received at the apparatus from the at least one repository, according to the received backup request; and
 a profile delivery unit configured to deliver the profile to a repository selected by the eUICC device based on the information for at least one repository,
 wherein the repository information providing unit generates the information for at least one repository including list information and availability information for the at least one repository and delivers the information to the eUICC device.

10. The apparatus according to claim 9, wherein the backup request reception unit receives credential information of a user of the eUICC device together with the backup request.

11. The apparatus according to claim 9, wherein the profile delivery unit receives a profile encrypted by the eUICC device and delivers the encrypted profile to the repository selected by the eUICC device.

12. The apparatus according to claim 9, wherein the profile delivery unit delivers the profile to two or more repositories selected by the eUICC device.

* * * * *